(12) United States Patent
Lee et al.

(10) Patent No.: US 12,560,153 B2
(45) Date of Patent: Feb. 24, 2026

(54) OPERATION METHOD OF A HEAT ENGINE DEVICE USING A SINGLE ION

(71) Applicant: POSTECH RESEARCH AND BUSINESS DEVELOPMENT FOUNDATION, Pohang-si (KR)

(72) Inventors: Moon Joo Lee, Pohang-si (KR); Myung Hun Kim, Pohang-si (KR); Jun Hee Cho, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/744,460

(22) Filed: Jun. 14, 2024

(65) Prior Publication Data

US 2025/0129727 A1 Apr. 24, 2025

(30) Foreign Application Priority Data

Oct. 18, 2023 (KR) ........................ 10-2023-0139870
Jan. 16, 2024 (KR) ........................ 10-2024-0006403

(51) Int. Cl.
F03G 7/00 (2006.01)
B82B 1/00 (2006.01)
B82Y 99/00 (2011.01)
F01K 27/00 (2006.01)
F03G 7/10 (2006.01)

(52) U.S. Cl.
CPC ............. *F03G 7/092* (2021.08); *B82B 1/001* (2013.01); *B82Y 99/00* (2013.01); *F01K 27/00* (2013.01); *F03G 7/135* (2021.08)

(58) Field of Classification Search
None
See application file for complete search history.

(56) References Cited

FOREIGN PATENT DOCUMENTS

CN 105869986 A * 8/2016 .......... H01J 49/4225
CN 113421687 A * 9/2021 .............. G21K 1/00
(Continued)

OTHER PUBLICATIONS

"Nanoscale Heat Engine Beyond the Carnot Limit", Roßnagel, J. et al., Physical Review Letters, American Physical Society, vol. 112, Issue 3, 5 pgs, Jan. 2014, https://link.aps.org/doi/10.1103/PhysRevLett. 112.030602). (Year: 2014).*

(Continued)

*Primary Examiner* — Laert Dounis
(74) *Attorney, Agent, or Firm* — Morgan, Lewis & Bockius LLP

(57) ABSTRACT

Provided is an operation method of a heat engine device using a single ion configured to greatly improve the efficiency of a heat engine by performing work in a different way than heat engine apparatuses to which classical thermodynamics applies. With the single ion heat engine device, a heat engine cycle in accordance with an auto engine cycle can be established on a micro-scale. Accordingly, the heat engine device using single ion has the effect of being able to be utilized as a substantially mesoscopic or nano-scale heat engine. This utilization is based on concepts, such as temperature, entropy, and pressure, that vary with features of a micro-miniaturized heat engine and types of thermal reservoirs and on interpretation of a change in engine efficiency.

11 Claims, 8 Drawing Sheets

(56)　　　　　References Cited

FOREIGN PATENT DOCUMENTS

| CN | 112750549 | B | * | 9/2022 | ............. | G21K 1/003 |
| CN | 116759288 | A | * | 9/2023 | ............. | H01J 49/423 |
| CN | 219788162 | U | * | 10/2023 | | |
| EP | 3832694 | A1 | * | 6/2021 | ............. | G21K 1/003 |
| KR | 10-2024-0094888 | A | | 6/2024 | | |
| WO | WO-2025008434 | A1 | * | 1/2025 | ............. | G06N 10/40 |

OTHER PUBLICATIONS

"A single-atom heat engine", Roßnagel et al., American Association for the Advancement of Science, vol. 352, pp. 325-329, Apr. 2016, http://dx.doi.org/10.1126/science.aad6320). (Year: 2016).*

"Single-Atom Heat Machines Enabled by Energy Quantization", Gelbwaser-Klimovsky, David et al., Physical Review Letters, American Physical Society, vol. 120, Apr. 2018, http://dx.doi.org/10.1103/PhysRevLett.120.170601). (Year: 2018).*

"Single-Ion Heat Engine at Maximum Power", Abah et al., Phys. Rev. Lett. 109, 203006—Published Nov. 14, 2012, DOI: https://doi.org/10.1103/PhysRevLett.109.203006 (Year: 2012).*

"Finite-time performance of a single-ion quantum Otto engine", Chand et al., Phys. Rev. E 103, 032144—Published Mar. 24, 2021 , DOI: https://doi.org/10.1103/PhysRevE.103.032144 (Year: 2021).*

Hong, Jungsoo, et al. "Numerical investigation of a segmented-blade ion trap with biasing rods." Applied Physics B 129.1 (2023): 16.

Kim, Myunghun, et al. "Ion trap with gold-plated alumina: Substrate and surface characterization." AIP Advances 12 (11) (2022).

Levy, Amikam, et al. "Single-atom heat engine as a sensitive thermal probe." New Journal of Physics 22.9 (2020): 093020.

Medina González, P. U., I. Ramos-Prieto, and B. M. Rodríguez-Lara. "Heat-flow reversal in a trapped-ion simulator." Physical Review A 101.6 (2020): 062108.

Office Action in Korean Patent Application No. 10-2024-0006403 dated Sep. 22, 2025, 6 pages.

* cited by examiner

Anti-squeezed        Squeezed

OPERATION METHOD OF A HEAT ENGINE DEVICE USING A SINGLE ION

TECHNICAL FIELD

The present disclosure relates to an operation method of a heat engine device, and more particularly, to operation method of a heat engine device using a single ion configured to greatly improve the efficiency of the engine cycle in a different way than a heat engine apparatus to which classical thermodynamics applies.

BACKGROUND ART

The heat engine is an apparatus that utilizes two types of thermal reservoirs having different temperatures, thereby extracting the quantity of heat resulting from a difference in temperature between the two types of thermal reservoirs, and converting the extracted quantity of heat into dynamic work. At this point, the efficiency of the heat engine is defined from work W during one engine cycle and the extracted quantity of heat Q.

Heat engines in the related art, such as steam engines, gasoline engines, diesel engines, and rocket engines, operate on a macroscopic scale, have limitations in reducing the sizes thereof, and use a fuel, such as gasoline or gas, that is composed of a large number of atoms. Accordingly, these heat engines, to which the concept of classical thermodynamics applies, have a thermodynamic limit, and cannot have engine efficiency that exceeds theoretical Carnot efficiency. Therefore, the primary concern with the engine is to increase the engine efficiency and extend its lifetime.

In addition, with a trend toward micro-miniaturizing electronic devices and an increasing demand for lower electricity consumption, miniaturization efforts in the semiconductor manufacturing process are underway. Moreover, there is a need to develop a micro-miniaturized heat engine that is utilizable to drive a mesoscopic or nano-scale device.

According to this need, with considerable concern, research has been conducted on quantum heat engines instead of heat engines, such as gasoline engines, to which classical thermodynamics applies.

In the quantum heat engine, the conception of a thermodynamics limit or a thermal equilibrium, which is used in classical thermodynamics, is not applied as is. Factors, such as fluctuations, are important variables in an engine operation. Moreover, attempts have been made to establish a heat engine cycle on quantum and nanoscale, with a focus on the possibility that, according to a technique for realizing a thermal reservoir, under a specific condition, the efficiency of the quantum heat engine is expected to reach or even go beyond the Carnot efficiency, which is the efficiency of a cycle of a well-known ideal heat engine.

DISCLOSURE

Technical Problem

The object of the present disclosure is to provide operation method of a heat engine device using a single ion configured to greatly improve the efficiency of the engine cycle by using as a working fluid a single ion trapped by a single ion trapping system and thus performing work in a different way than a heat engine apparatus to which classical thermodynamics applies.

Technical Solution

In order to accomplish the above-mentioned object, according to one aspect of the present disclosure, there is provided an operation method of a heat engine device, the method comprising: using, by the heat engine device, a single ion that is trapped using an ion trapping device, wherein using the single ion comprises: generating a thermal reservoir by applying electric noise to the single ion; and generating work by establishing one cycle using the thermal reservoir.

In the heat engine device using a single ion, the one cycle may include an isentropic compression stage, an isochoric heating stage, an isentropic expansion stage, and an isochoric cooling stage.

In the heat engine device using single ion, the isentropic compression stage and the isentropic expansion stage may be implemented by maintaining a ratio between a temperature of the trapped ion and the ion trap frequency.

In the heat engine device using single ion, the isochoric heating stage and the isochoric cooling stage may be implemented by increasing and decreasing, respectively, an amplitude of the electric noise that is applied to the trapped ion.

In the heat engine device using single ion, the thermal reservoir may be a coherent thermal reservoir generated by applying the modulated electric noise to the single ion.

In the heat engine device using single ion, the thermal reservoir may be a squeezed thermal reservoir generated by applying the squeezed electric noise to the single ion.

In the heat engine device using single ion, the single ion may be an ytterbium (Yb) ion ($^{174}Yb^+$).

Advantageous Effects

With operation method of a heat engine device using a single ion according to the present disclosure, a heat engine cycle in accordance with an auto engine cycle can be established on a micro-scale. In addition, accordingly, the heat engine device using single ion has the effect of being able to be utilized as a substantially mesoscopic or nano-scale heat engine. This utilization is based on concepts, such as temperature, entropy, and pressure, that vary with features of a micro-miniaturized heat engine and types of thermal reservoirs and on interpretation of a change in engine efficiency.

In addition, the operation method of a heat engine device using a single ion, according to the present disclosure has the advantage of being able to be utilized not only for transferring an ion in the same ion trapping system, but also to serve to drive other miniaturized devices, such as a miniaturized robot and a DNA nanorobot.

MODE FOR INVENTION

Figure 1:
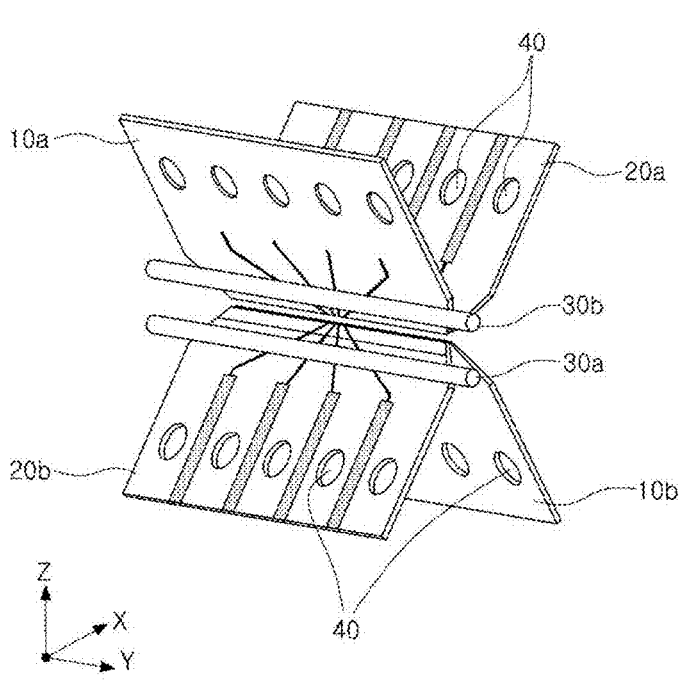
FIG. 1 is a view illustrating an ion trapping device capable of trapping an ion for use in a single ion heat engine device.

Various modifications may be made to the present disclosure, and the present disclosure may be practiced in various forms. A preferred embodiment of the present disclosure will be described in detail with reference to the drawings. However, the present disclosure is not intended to be limited to specifically disclosed forms. All alterations, equivalents, and substitutes that are included within the technical idea of the present disclosure should be understood as falling within the scope of the present disclosure.

Unless otherwise defined, all terms including technical and scientific terms, which are used in the present specification, have the same meanings as are normally understood by a person of ordinary skill in the art to which the present disclosure pertains. The term as defined in commonly used dictionaries should be construed as having the same meaning in context as that in the art and, unless otherwise explicitly defined in the present specification, should not be construed as having an excessively implied meaning or a purely literal meaning.

There is required an ion trapping device capable of stably trapping a single ion for configuring a heat engine device using single ion according to the present disclosure. During a process of manufacturing the ion trapping device, the following steps may be important considerations: analysis of the properties of alumina ceramics used as an electrode substrate material; substrate manufacturing involving ceramics processing based on a contrived electrode design; gold electroplating of a substrate; fixation of electrodes by utilizing a sapphire spacer; and wire bonding for electrical connections between electrodes.

Accordingly, in manufacturing a ceramics substrate for electrodes, processing of an overall shape, precision processing of grooves using a laser, and manufacturing of a spacer formed of sapphire were performed. The following processes were performed: selection of an electrode material; measurement using an SEM and a 3D confocal microscope to identify a damaged portion of an electrode occurring during a laser precision process and during a polishing operation for improving surface roughness near trapping zone, and Piranha cleaning after substrate formation, but before sputtering; and oxygen plasma etching before/after sputtering.

An adhesion layer was formed of 200 nm of titanium (Ti) and 30 nm of gold (Au) before gold electroplating necessary for a ceramics substrate to be used as electrodes. Subsequently, the gold electroplating was performed to a thickness of 3 μm, and wire bonding for assembling completed electrodes and electrical connections therebetween was performed.

Accordingly, an ion trapping system was fully assembled within a vacuum chamber based on the manufactured electrodes, and an environment of an ultrahigh vacuum of 1e-10 Torr or less was established by utilizing connected vacuum pumps. Subsequently, lasers necessary to trap an ytterbium ($^{174}Yb^+$) ion intended to be used, and a device and optical components for imaging an ion were set up. Based on this setup, experimental parameters for optimal laser powers, operational wavelengths, a combination of DC, RF voltages, micro-motion compensation, and the like were identified in order to trap a single ion, and a system capable of trapping stable linear string of ions (typically, one to four crystallized ions) was developed.

An ion trapping device 1 according to a preferred embodiment of the present disclosure will be described below in more detail with reference to the accompanying drawings.

FIG. 1 is a view illustrating the ion trapping device 1 capable of trapping an ion for use in the heat engine device using single ion.

As illustrated in FIG. 1, the ion trapping device 1 according to the present disclosure includes two RF electrodes 10a and 10b that are blade-shaped, and two DC electrodes 20a and 20b that are blade-shaped. For convenience, the two RF electrodes may be separately referred to as a first electrode 10a and a second RF electrode 10b, respectively. The two DC electrodes may be separately referred to as a first DC electrode 20a and a second DC electrode 20b. In addition, the ion trapping device 1 includes compensation electrodes 30a and 30b in a pair within one of four spaces that result from division by the RF electrodes 10a and 10b and the DC electrodes 20a and 20b. The compensation electrodes 30a and 30b, which are bar-shaped, extend in the Z-direction.

The RF electrodes 10a and 10b and the DC electrodes 20a and 20b, for example, may be sequentially arranged in the following order in the circumferential direction of the imaginary central axis extending in the Z-axis direction: the first RF electrode 10a, the first DC electrode 20a, the second RF electrode 10b, and the second DC electrode 20b.

The two RF electrodes 10a and 10b facing each other are positioned on the same plane and are symmetrical about the imaginary central axis. Likewise, the two DC electrodes 20a and 20b facing each other are positioned on the same plane and are symmetrical about the imaginary central axis. Therefore, the electrodes 10a, 10b, 20a, and 20b may be formed in such a manner that respective leading end thereof face the imaginary central axis.

One or more of the first RF, second RF, first DC, and second DC electrodes 10a, 10b, 20a, and 20b may include one or more finely machined holes 40.

In the ion trapping device 1, the first RF electrode 10a, the first DC electrode 20a, the second RF electrode 10b, and the second DC electrode 20b in this order are circumferentially formed around the imaginary central axis in the circumferential direction, and the compensation electrodes 30a and 30b in a pair are installed to be spaced apart from each other within a space between the first RF electrode 10a and the second DC electrode 20b. As a result, the ion trapping device 1 can stably trap an ion.

Figure 2:
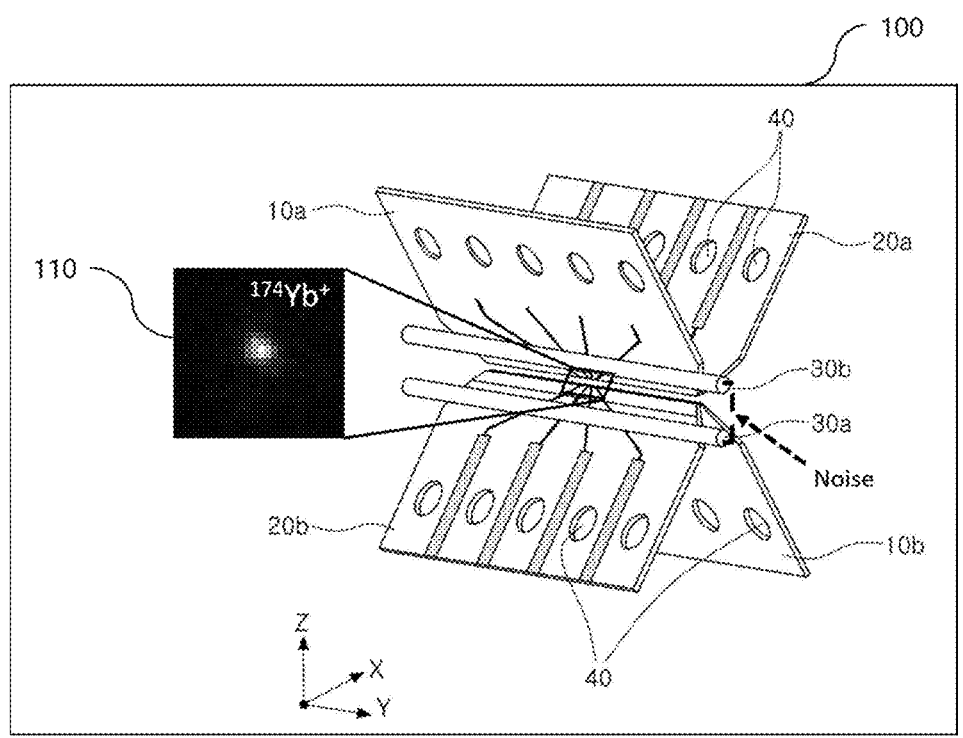
FIG. 2 is a view that is referenced to describe a process of realizing a thermal reservoir to trap an ion and establish a heat engine cycle.

FIG. 2 is a view that is referenced to describe a process of trapping an ion and realizing a thermal reservoir to establish heat engine cycle.

The ion trapping device 1 illustrated in FIG. 1 was arranged within an ultrahigh vacuum chamber. Thereafter, electric field potential was formed by applying an appropriate voltage to the first and second RF electrodes 10a and 10b in a pair and to the first and second DC electrodes 20a and 20b in a pair under an ultrahigh vacuum of $8.6×10^{-10}$ Torr. An ytterbium (Yb) ion was trapped using a laser-induced ionization technology and a cooling technology. Thereafter, the thermal reservoir for the heat engine cycle was realized by applying heat to the ion trapped by applying electric noise via the compensation electrodes 30a and 30b in a pair.

The heat engine device (100) using the single ion according to the present disclosure is configured to perform the following four strokes on the single ion (110) trapped in the ion trapping device: isentropic compression, isochoric heating, isentropic expansion, and isochoric cooling.

A working fluid in the heat engine device (100) using the single ion is represented by a phonon of the ion (110) that is trapped by the ion trapping device using the electric field potential and the laser cooling. Two thermal reservoirs necessary for heating and cooling are realized through the electric noise having a random amplitude with which to drive a movement of the ion (=increasing the number of phonons).

At this point, an isentropic stage was implemented by maintaining a ratio between a temperature of the trapped ion (110) and an ion trap frequency, and an isochoric stage was implemented by increasing or decreasing an amplitude of the electric noise that is applied to the ion (110).

Dynamic work that results from conversion by the operation of the heat engine device using single ion according to the present disclosure may be defined as mesoscopic work, achieved by applying force to another trapped neighboring ion through Coulombic interactions.

Figure 3A:
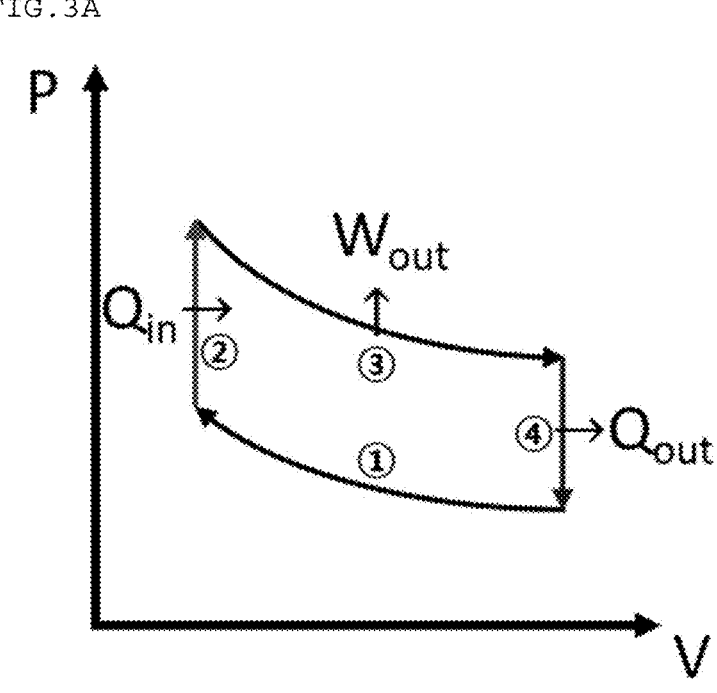
FIGS. 3A and 3B are diagrams each showing the results of an auto heat engine operating through a single cycle.
Figure 3B:
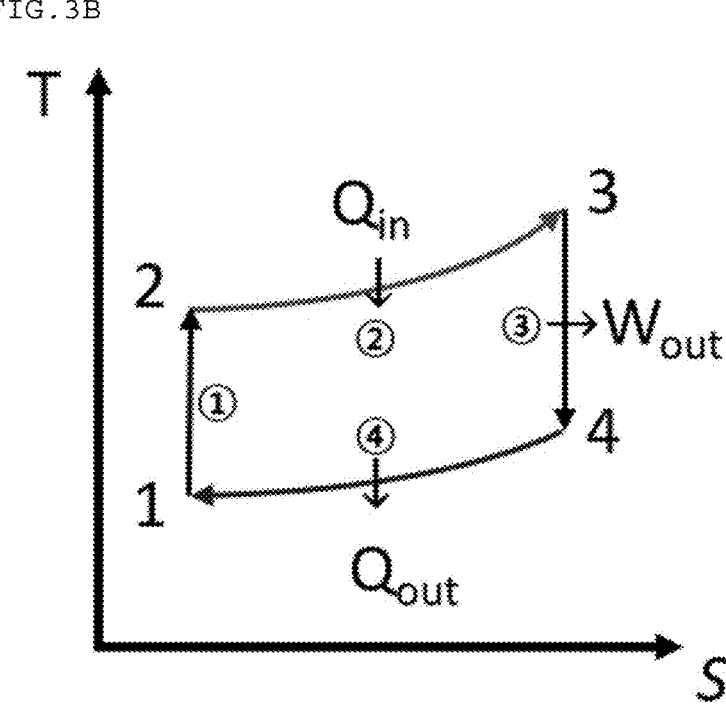

FIGS. 3A and 3B are diagrams each showing the results of an auto heat engine operating through a single cycle.

As illustrated in FIGS. 3A and 3B, the auto heat engine is configured to operate with a total of four strokes: two isentropic stages (①) and (③) and two isochoric stages (②) and (④). From a pressure-volume (P-V) diagram, an amount of work occurring while the auto heat engine operates through a single cycle can be calculated. From a temperature-entropy (T-S) diagram, an amount of heat extracted can be calculated. The engine efficiency can be calculated using the amount of work and the amount of heat extracted.

The heat engine device using the single ion according to the present disclosure can operate through the same cycle as the auto heat engine as illustrated in FIGS. 3A and 3B. The engine efficiency can be calculated through the same process. At this point, the engine efficiency can be improved according to a type of the thermal reservoir realized through thermal reservoir engineering, along with optimization of the temperature and the ion trapping properties that are used for heating and cooling. The temperature and the ion trapping properties are included in the cycle in order to increase the engine efficiency.

Figure 4A:
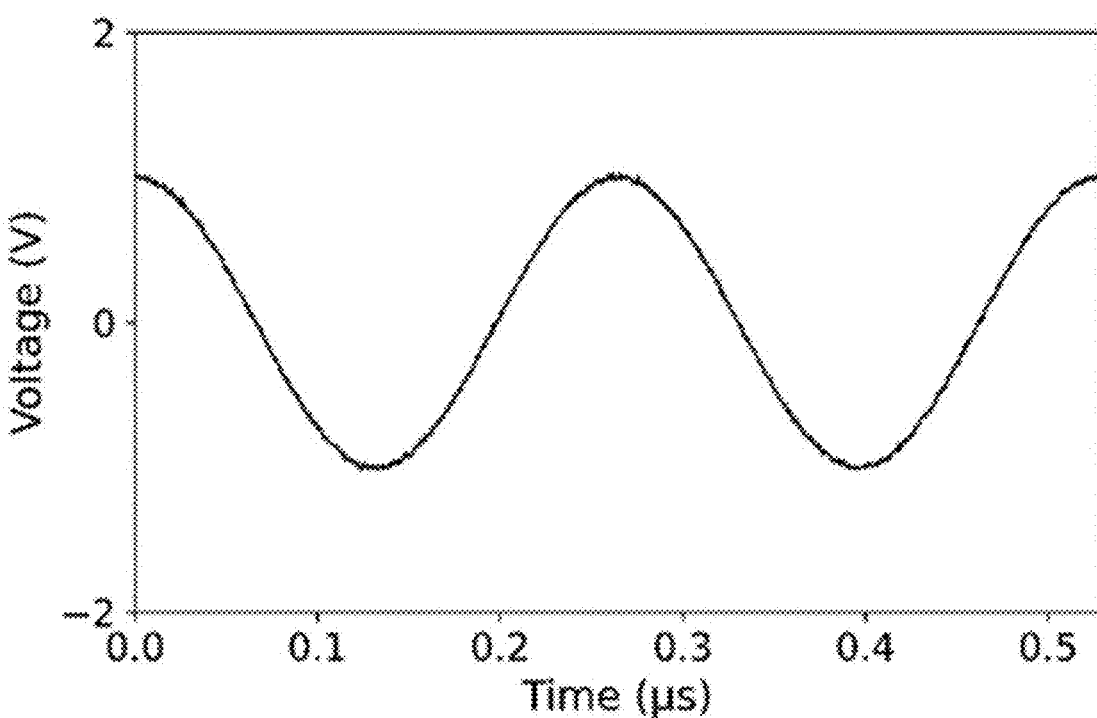
FIGS. 4A, 4B, and 4C are graphs each showing an example of the realization of the thermal reservoir.
Figure 4B:
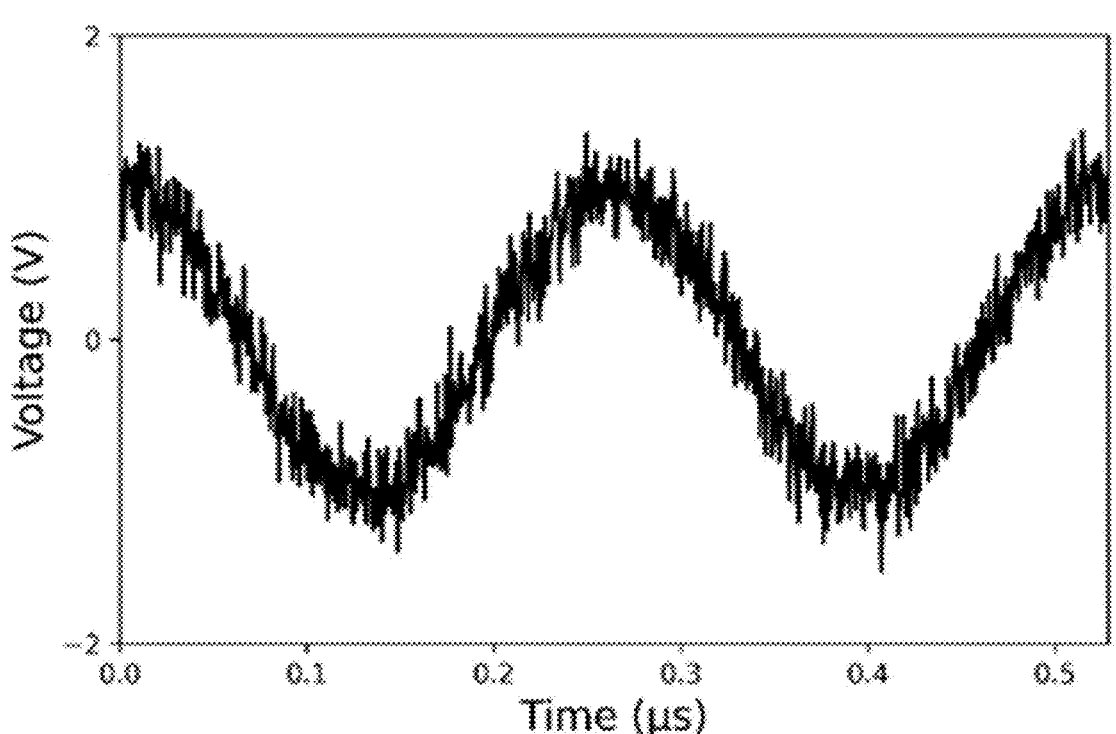
Figure 4C:
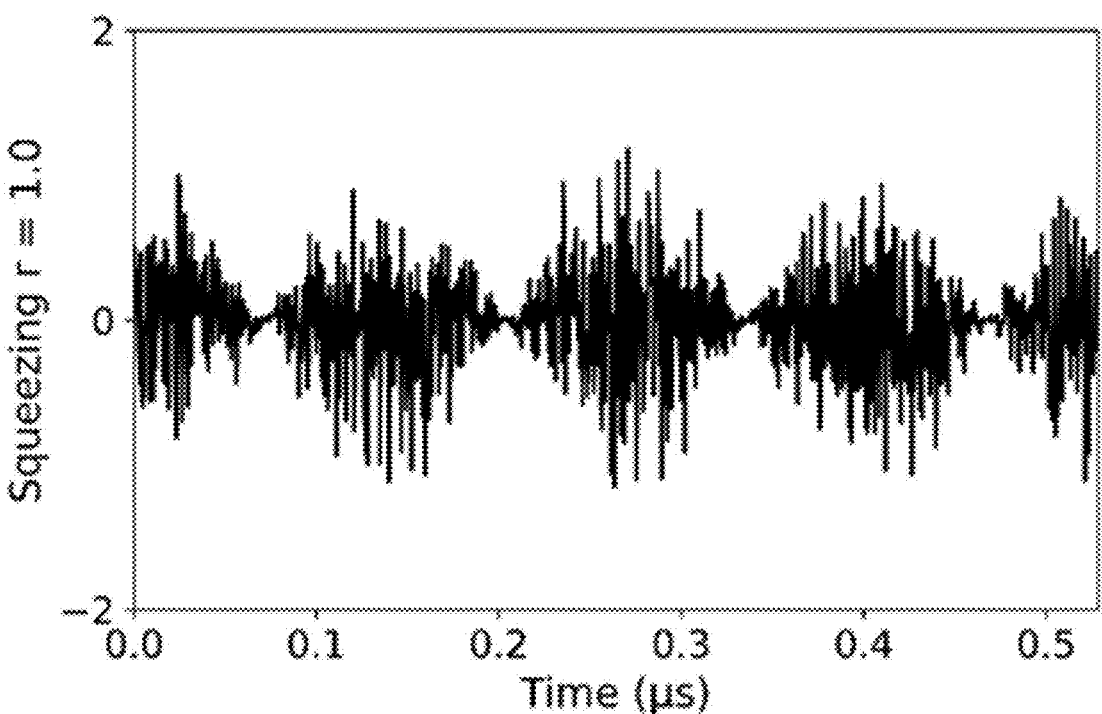

FIGS. 4A, 4B, and 4C are graphs each showing an example of the realization of the thermal reservoir.

FIG. 4A is a graph showing an AC voltage signal for inducing the trapped ion into a coherent state with a predetermined phase and frequency. FIG. 4B is a graph showing a wavelength of a signal intended to be applied to an ion to realize a coherent thermal reservoir by applying the electric noise to the ion in the coherent state in FIG. 4A. FIG. 4C is a graph showing a squeezed thermal reservoir realized according to the thermal reservoir engineering.

Figure 5:
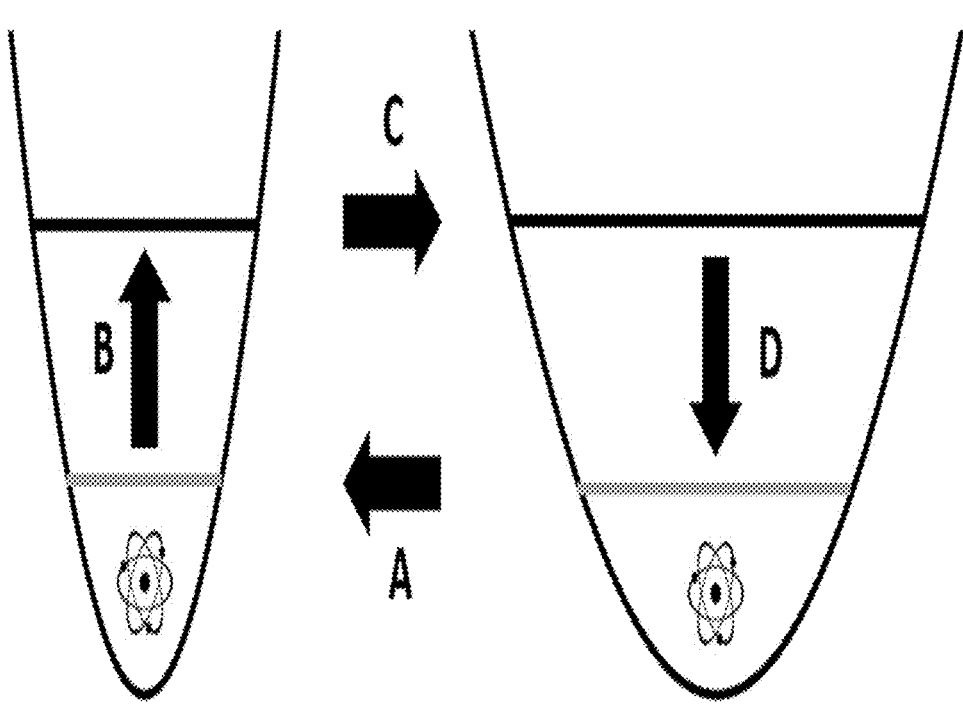
FIG. 5 is a view that is referenced to describe a heat engine device using single ion according to the present disclosure.

FIG. 5 is a view that is referenced to describe the operation method of a heat engine device using single ion according to the present disclosure.

As illustrated in FIG. 5, the heat engine device using single ion according to the present disclosure is configured to operate in isentropic compression step A, isochoric heating step B, isentropic expansion step C, and isochoric cooling step D in this order.

Unlike a classical heat engine apparatus in the related art that uses gasoline gas consisting of many atoms, the heat engine device using single atom (ion) according to the present disclosure, which is illustrated in FIG. 5, uses phonon of a single ion as working fluid. In the heat engine apparatus in the related art, pressure is applied to the working fluid using a piston. However, according to the present disclosure, the intensity of an electric field applied to trap an ion is adjusted, and a potential wall formed accordingly applies pressure to the ion. This process corresponds to the isentropic compression and expansion stages.

In addition, the thermal reservoir is necessary for a heating and cooling process. According to the present disclosure, the thermal reservoir is realized through the electric noise applied to the single trapped-ion, and accordingly, isochoric heating and cooling stages can be implemented.

Subsequently, when operating through a cycle, the heat engine device using single ion, like the heat engine apparatus in the related art, can draw the P-V diagram and the T-S diagram. An amount of occurring work and an amount of heat being input and output can be calculated from the P-V diagram and the T-S diagram. Subsequently, the efficiency of the heat engine device using single ion can be calculated.

At this point, an efficient heat and work mechanism can be realized by optimizing a method of setting the temperatures of thermal reservoirs, the intensity of a potential wall, and the like. The heat engine device using single ion can be configured to vary in shape and efficiency by adjusting a form of the electric noise, which serves as a heat source, according to the thermal reservoir engineering. This heat engine device using single ion will be described below.

Figure 6:
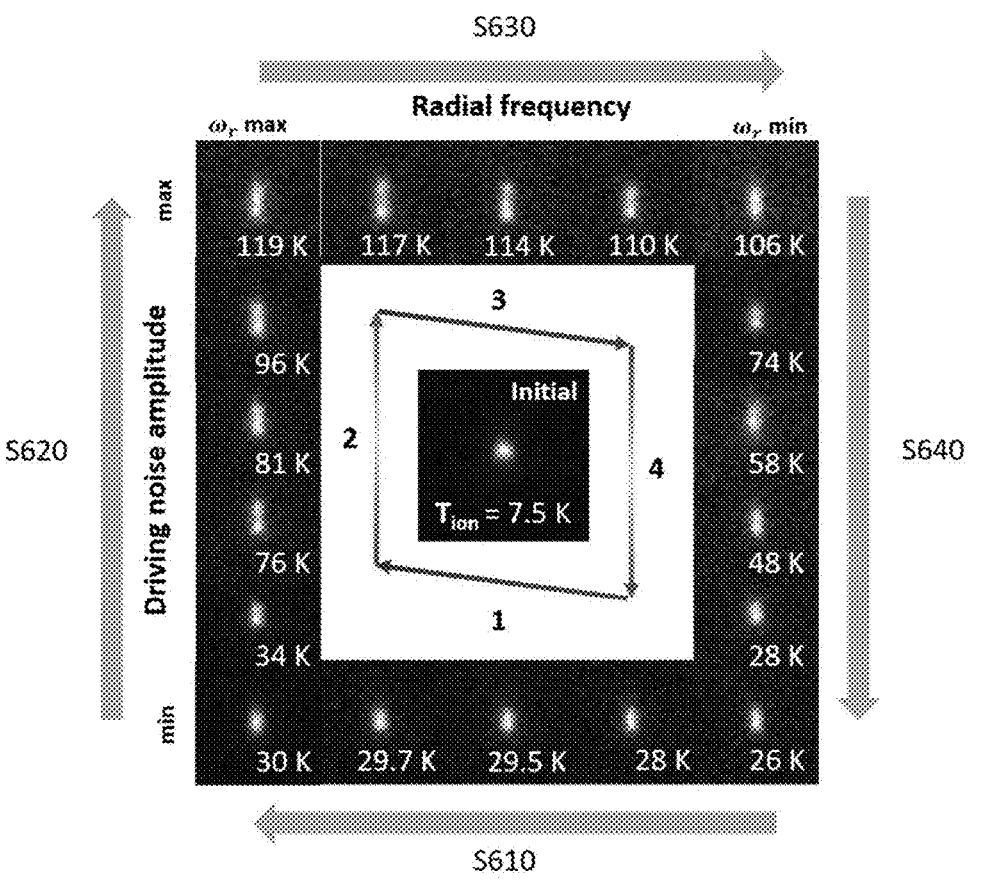
FIG. 6 is a diagram that is referenced to describe establishment of a cycle of the heat engine device using single ion through the use of a coherent thermal reservoir in FIG. 5.

FIG. 6 is a diagram that is referenced to describe the establishment of the cycle of the heat engine device using single ion through the use of the coherent thermal reservoir.

Isentropic compression step S610, isochoric heating step S620, isentropic expansion step S630, and isochoric cooling step S640, which are illustrated in FIG. 6, correspond to the steps A, B, C, and D, respectively, which are illustrated in FIG. 5.

In isentropic compression step S610, ion temperature ($T_{ion}$) increases from the lowest temperature of 26 K to a temperature of 30 K while maintaining the same entropy. In isochoric heating step S620, in a state where a volume is maintained to a predetermined level, heating proceeds, and the ion temperature ($T_{ion}$) increases from 30 K to the highest temperature of 119 K. In isentropic expansion step S630, the ion temperature ($T_{ion}$) decreases from the highest temperature of 119 K to a temperature of 106 K while maintaining the same entropy. In isochoric cooling step S640, in the state where the volume is maintained to a predetermined level, the ion temperature ($T_{ion}$) decreases from a temperature of 106 K to the lowest temperature of 26 K.

Figure 7A:
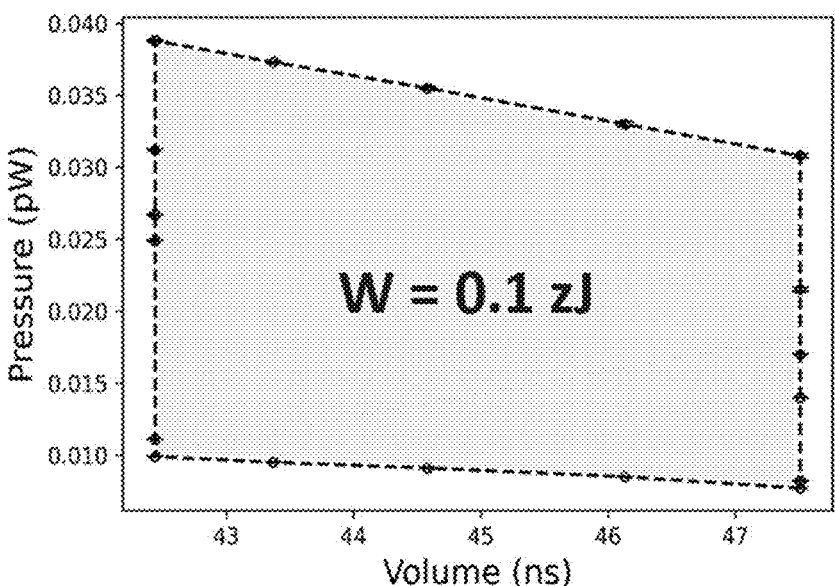
FIGS. 7A and 7B are a P-V diagram and a T-S diagram, respectively, of the heat engine device using single ion that is configured using the coherent thermal reservoir.
Figure 7B:
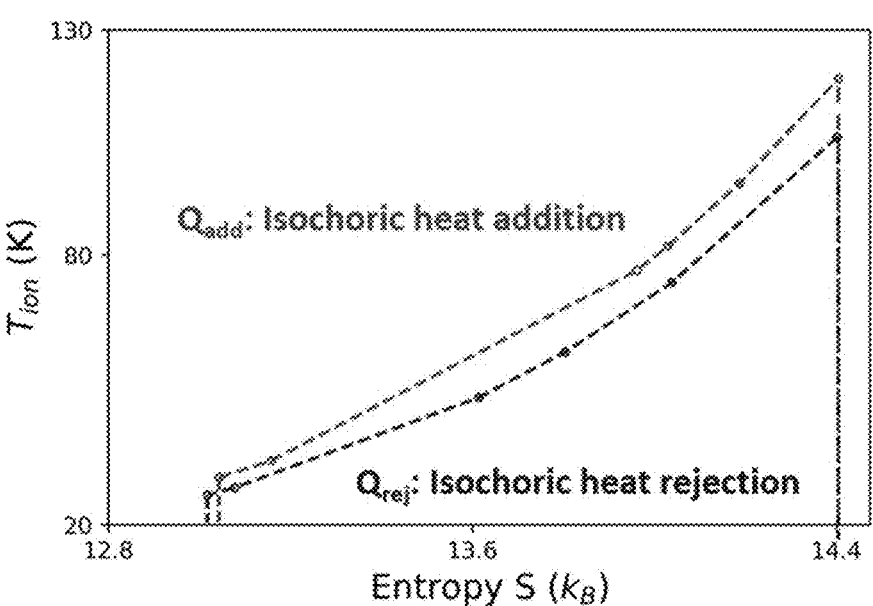

FIGS. 7A and 7B are a P-V diagram and a T-S diagram, respectively, of the heat engine device using single ion that is configured using the coherent thermal reservoir.

According to the P-V diagram illustrated in FIG. 7A, work W, obtained through the heat engine device using single ion that is configured using the coherent thermal reservoir, corresponds to 0.1 zeptojoules (zJ).

In addition, according to the T-S diagram illustrated in FIG. 7B, the quantity of heat $Q_h$, input into the heat engine device using single ion that is configured using the coherent thermal reservoir, corresponds to 2.4 zeptojoules (zJ).

Therefore, from FIGS. 7A and 7B, the efficiency of the heat engine device using single ion that is configured using the coherent thermal reservoir can be obtained using Equation 1, which follows.

$$\eta_{cycle} = W/Q_h = 0.1/2.4 = 0.042\ (\ = 4.2\%) \qquad \text{Equation 1}$$

The efficiency using Equation 1 is found to be signifi-cantly lower than Carnot efficiency calculated using Equation 2, which follows.

$$\eta_{Carnot} = 1 - T_{c(ion)}/T_{h(ion)} = 1 - 26/119 = 0.78\ (\ = 78\%) \qquad \text{Equation 2}$$

Figure 8:
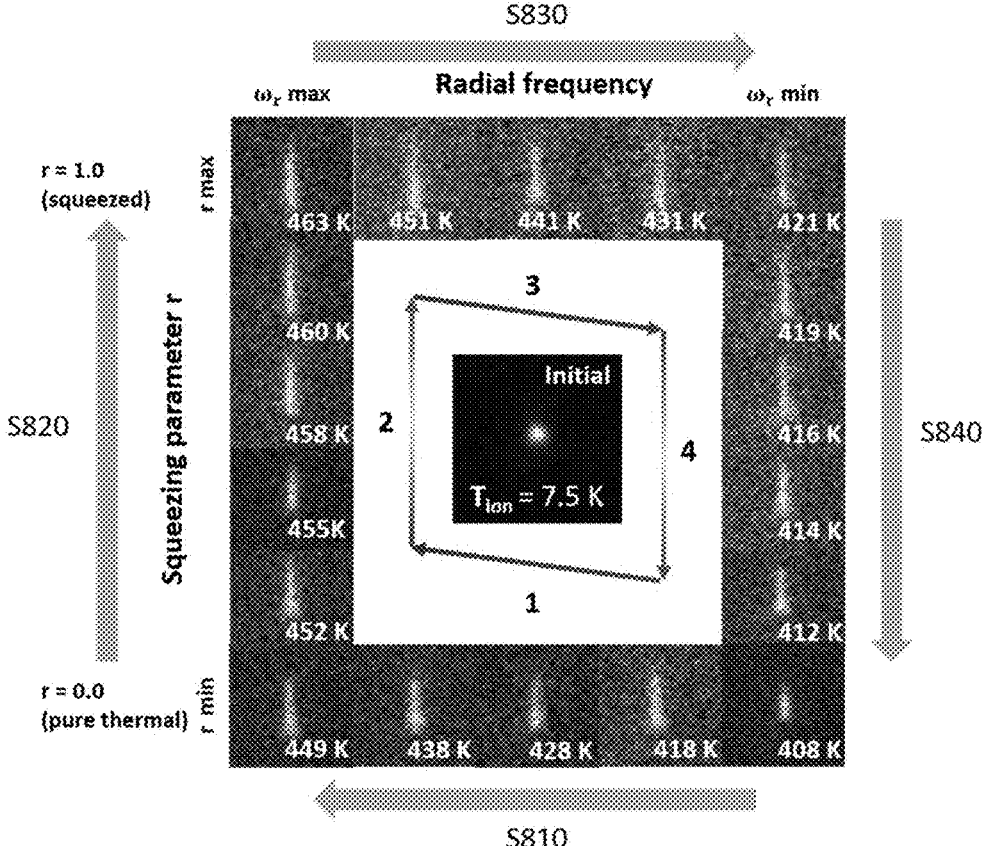
FIG. 8 is a diagram that is referenced to describe the establishment of the cycle of the heat engine device using single ion in FIG. 5 through the use of a squeezed thermal reservoir.

FIG. 8 is a diagram that is referenced to describe the establishment of the cycle of the heat engine device using single ion in FIG. 5 through the use of the squeezed thermal reservoir.

Isentropic compression step S810, isochoric heating step S820, isentropic expansion step S830, and isochoric cooling step S840, which are illustrated in FIG. 8, correspond to the steps A, B, C, and D, respectively, which are illustrated in FIG. 5.

In isentropic compression step S810, ion temperature ($T_{ion}$) increases from the lowest temperature of 408 K to a temperature of 449 K while maintaining the same entropy. Isochoric heating step S820, in a state where a volume is maintained to a predetermined level, heating proceeds, and the ion temperature ($T_{ion}$) increases from 449 K to the highest temperature of 463 K. In isentropic expansion step S830, the ion temperature ($T_{ion}$) decreases from the highest temperature of 463 K to a temperature of 421 K while maintaining the same entropy. In isochoric cooling step S840, in the state where the volume is maintained to a predetermined level, the ion temperature ($T_{ion}$) decreases from a temperature of 421 K to the lowest temperature of 408 K.

Figure 9:
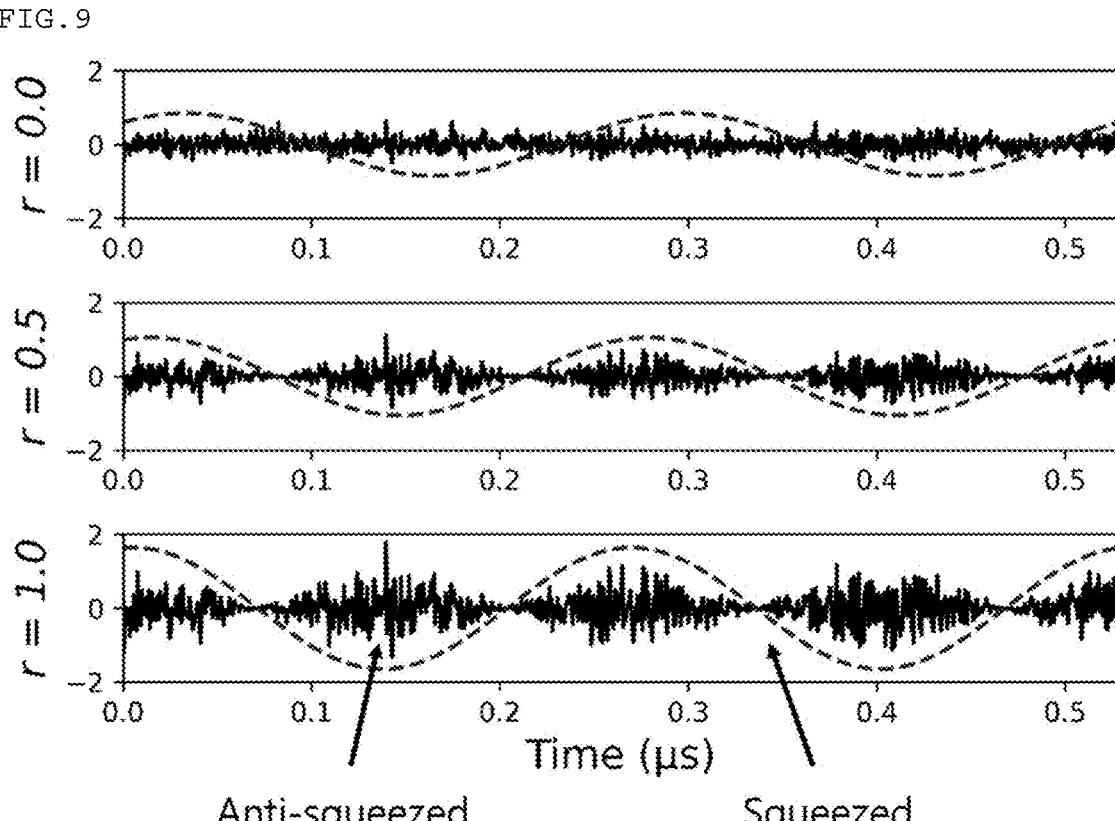
FIG. 9 is a group of waveform diagrams each showing the squeezed thermal reservoir that varies in realization according to a squeezing parameter.

FIG. 9 is a group of waveform diagrams each showing the squeezed thermal reservoir that varies in realization according to a squeezing parameter.

From FIG. 9, it can be seen that as the squeezing parameter r increases, a noise amplitude also increases, and that this increase in the noise amplitude simultaneously increases a difference in amplitude between an anti-squeezed mode and a squeezed mode. Therefore, an amount of heat in the anti-squeezed mode or the squeezed mode can be adjusted during the heating and cooling stages by adjusting the squeezing parameter r.

Figure 10A:
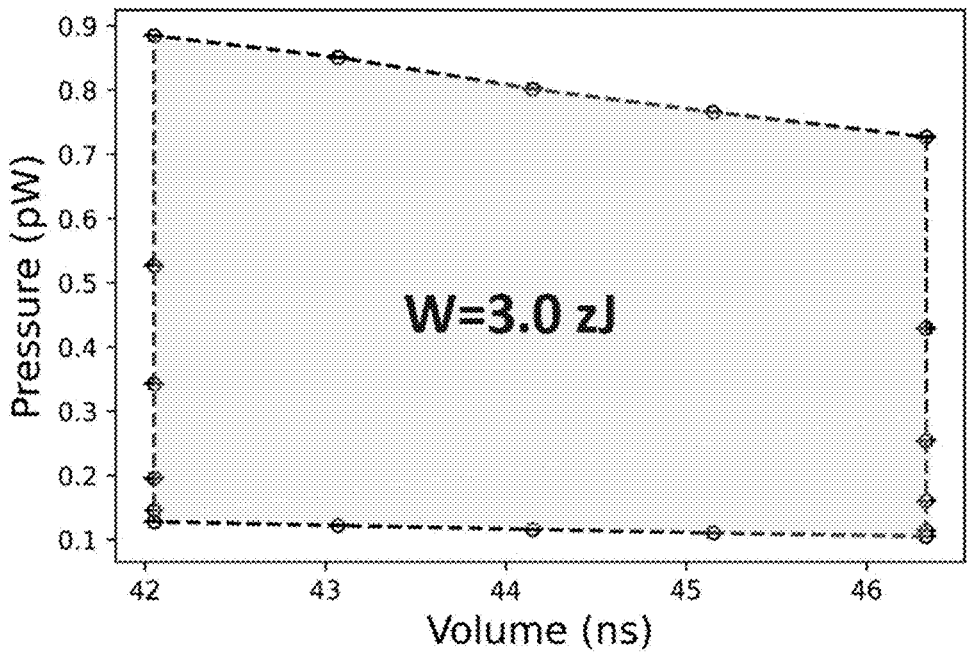
FIGS. 10A and 10B are a P-V diagram and a T-S diagram, respectively, of the heat engine device using single ion that is configured using the squeezed thermal reservoir.
Figure 10B:
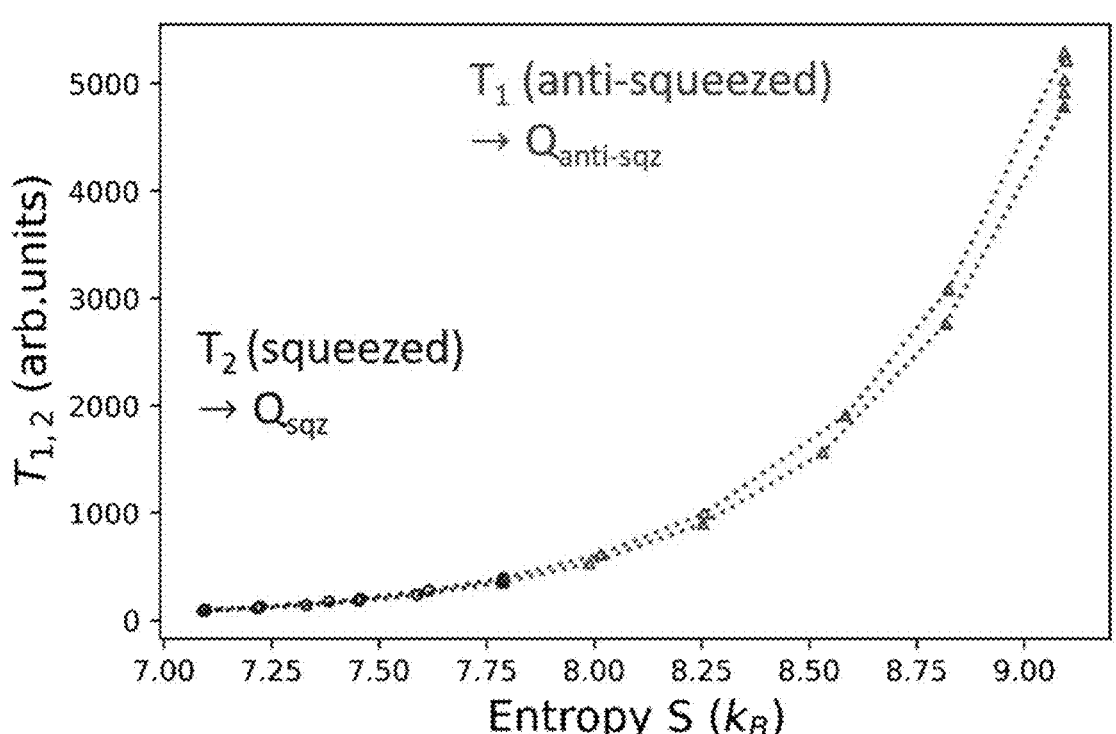

FIGS. 10A and 10B are a P-V diagram and a T-S diagram, respectively, of the heat engine device using single ion that is configured using the squeezed thermal reservoir.

According to the P-V diagram illustrated in FIG. 10A, work W, obtained through the heat engine device using single ion that is configured using the squeezed thermal reservoir, corresponds to 3.0 zeptojoules (zJ).

In addition, according to the T-S diagram illustrated in FIG. 10B, the quantity of heat $Q_h$, input into the heat engine device using single ion that is configured using the coherent thermal reservoir, has a value obtained by subtracting the quantity of heat $Q_{sqz}$, input in the blue-marked squeezed state, from the quantity of heat $Q_{anti\text{-}sqz}$, input in the red-marked anti-squeezed state. This value corresponds to 32.6 zeptojoules (zJ).

Therefore, from FIGS. 10A and 10B, the efficiency of the heat engine device using single ion that is configured using the squeezed thermal reservoir can be obtained using Equation 3, which follows.

$$\eta_{cycle} = W/Q_h = 3.0/32.6 = 0.092\ (\ = 9.2\%) \qquad \text{Equation 3}$$

The efficiency using Equation 3 is found to be signifi-cantly close to Carnot efficiency calculated using Equation 4, which follows.

$$\eta_{Carnot} = 1 - T_{c(ion)}/T_{h(ion)} = 1 - 408/463 = 0.1187\ (\ = 11.9\%) \qquad \text{Equation 4}$$

Therefore, in a case where the squeezed parameter r is adjusted, it is possible that under a specific condition, the efficiency of the heat engine device using single ion is close to Carnot efficiency, which is efficiency of a cycle of an ideal heat engine.

The invention claimed is:

1. An operation method of a heat engine device, the method comprising:
   using, by the heat engine device, a single ion that is trapped using an ion trapping device, wherein the ion trapping device comprises:
      a plurality of radio frequency (RF) electrodes, wherein each of the plurality of RF electrodes is disposed on a common RF electrode plane;
      a plurality of direct current (DC) electrodes, wherein each of the plurality of DC electrodes is disposed on a common DC electrode plane, and each of the RF electrodes and each of the DC electrodes are sym-metrically and alternately disposed about a central axis aligned with the single ion, wherein the plurality of RF electrodes and the plurality of DC electrodes are configured to provide an electric field potential to trap the single ion; and
      a plurality of compensation electrodes, wherein each of the plurality of compensation electrodes extends in an axis parallel to the central axis and is disposed between an RF electrode of the plurality of RF electrodes and a DC electrode of the plurality of DC electrodes,
   wherein using the single ion comprises:
      generating a thermal reservoir by applying electric noise via the plurality of compensation electrodes to the single ion; and
      generating work by establishing one cycle using the thermal reservoir.

2. The operation method of the heat engine device of claim 1, wherein the one cycle includes an isentropic com-pression stage, an isochoric heating stage, an isentropic expansion stage, and an isochoric cooling stage.

3. The operation method of the heat engine device of claim 2, wherein the isentropic compression stage and the isentropic expansion stage are implemented by maintaining a ratio between a temperature of the trapped ion and an ion trap frequency.

4. The operation method of the heat engine device of claim 2, wherein the isochoric heating stage is implemented by increasing an amplitude of the electric noise that is applied to the trapped ion, and wherein the isochoric cooling stage is implemented by decreasing an amplitude of the electric noise that is applied to the trapped ion.

5. The operation method of the heat engine device of claim 1, wherein the thermal reservoir is a coherent thermal reservoir generated by applying the electric noise to the single ion.

6. The operation method of the heat engine device of claim 1, wherein the thermal reservoir is a squeezed thermal reservoir generated by applying the electric noise to the single ion.

7. The operation method of the heat engine device of claim 1, wherein the single ion is an ytterbium (Yb) ion ($^{174}Yb^+$).

8. The operation method of the heat engine device of claim 1, wherein each of the plurality of RF electrodes is blade shaped.

9. The operation method of the heat engine device of claim 8, wherein each of the plurality of DC electrodes is blade shaped.

10. The operation method of the heat engine device of claim 9, wherein each of the plurality of compensation electrodes is bar shaped.

11. The operation method of the heat engine device of claim 10, wherein each of the plurality of compensation electrodes is disposed in a division defined between the blade shaped RF electrode of the plurality of RF electrodes and the blade shaped DC electrode of the plurality of DC electrodes.

* * * * *